United States Patent [19]

Dschen

[11] Patent Number: 5,376,781
[45] Date of Patent: Dec. 27, 1994

[54] METHOD AND A DEVICE FOR CHANGING THE OPTICAL CHARACTERISTICS OF A DISPLAY FIELD ON A CARRIER

[75] Inventor: Tsing Dschen, Dietikon, Switzerland

[73] Assignee: Landis & Gyr Business Support AG, Zug, Switzerland

[21] Appl. No.: 122,271

[22] Filed: Sep. 15, 1993

[30] Foreign Application Priority Data

Sep. 15, 1992 [CH] Switzerland .............. 02902/92

[51] Int. Cl.$^5$ ............................................. G06K 19/00
[52] U.S. Cl. ............................................. 235/487
[58] Field of Search ................ 235/487, 454; 283/904

[56] References Cited

U.S. PATENT DOCUMENTS 3,873,813  3/1975  Lahr ..................................... 235/380
4,958,065  9/1990  Weinberger ........................... 235/455

OTHER PUBLICATIONS

R. M. Ross, "Credit Card with an Erasable Field for Human Readability," IBM Technical Disclosure Bulletin, p. 1491, vol. 8, No. 11, Apr. 1966.

Primary Examiner—Davis L. Willis
Assistant Examiner—Karl D. Frech
Attorney, Agent, or Firm—Egli International

[57] ABSTRACT

A carrier for display fields or value characters, such as a credit card, contains optically readable display fields which can be erased by the effects of heat or which can at least be changed permanently in optical terms, and a storage layer for storing energy for the purpose of producing the thermal energy required for the heating effect at the location of the display field to be erased. In this way, the energy stored in the storage layer, which energy corresponds to at least the erase energy required, is released by the supply of an initial energy which is less than the erase energy. If a photoconductive layer is used additionally, the reading light beam can also serve to produce a local electrical current I in the region of the display field to be erased, wherein the current I produces sufficient thermal energy in the form of initial energy to set in notion the reaction process in the storage layer and to release the thermal energy stored therein. An arrangement of this kind can be used advantageously in instances where only a small electrical output is available for inducing a cancellation process.

11 Claims, 3 Drawing Sheets

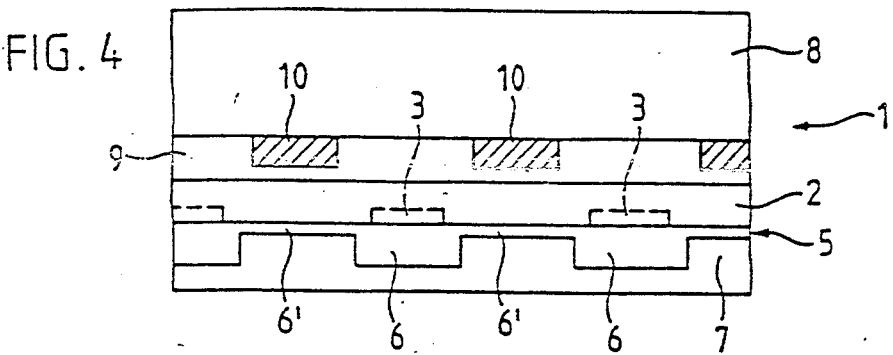
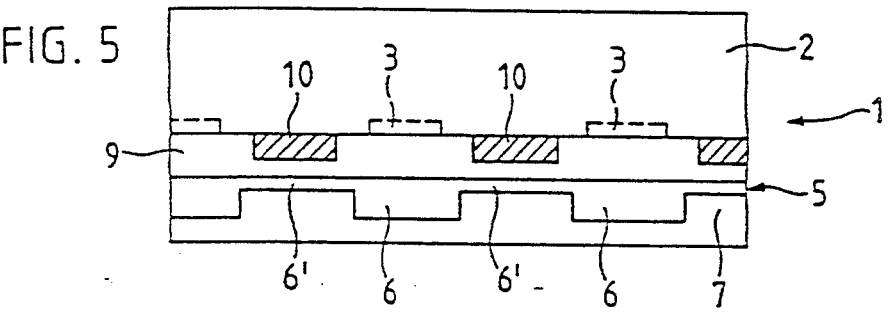
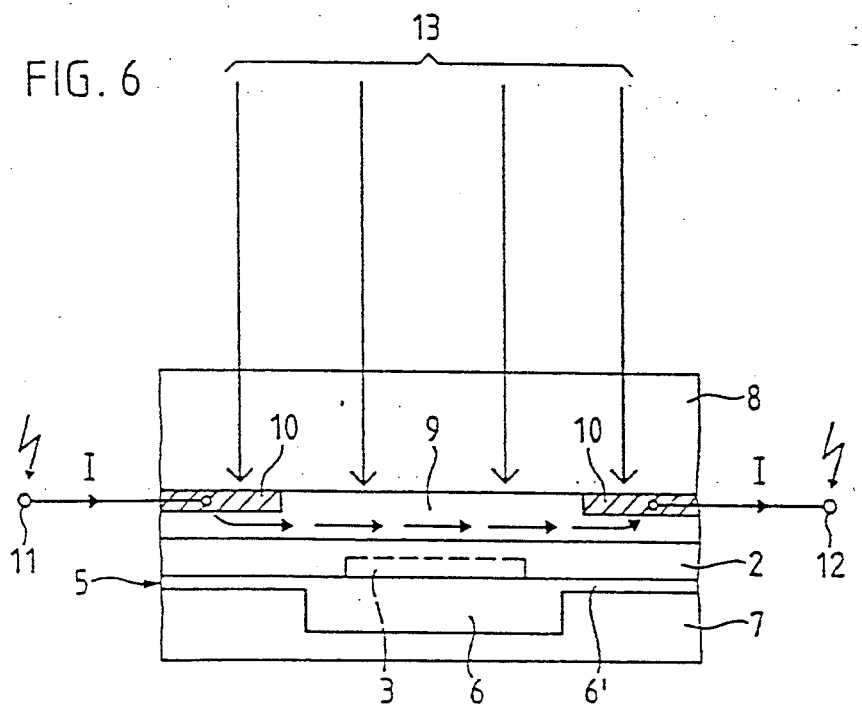

METHOD AND A DEVICE FOR CHANGING THE OPTICAL CHARACTERISTICS OF A DISPLAY FIELD ON A CARRIER

BACKGROUND OF THE INVENTION

1. Field of the Invention

The invention relates to a method for changing the optical characteristics of a display field on a carrier by releasing erase energy in the region of the display field.

2. Background of the Invention

Increasingly, for cashless payment of goods and services, credit payment means in the form of tokens, cards or similar carriers which have a number of units of value ave being used. If the units of value ave present on the carriers in the form of value characters which can be recognised optically and by machine, optical reading devices are also needed to read the data stored on the credit payment means and to check their authenticity, and cancelling devices are needed to cancel the respective number of units of value needed for payment from the credit means. To cancel the value character, energy usually has to be supplied while, for example, sufficient thermal energy is conducted to the location of the value character to locally soften the carrier material and destroy the value character in question.

CH-PS 635 949 discloses a credit payment means wherein the value characters ave contained in the form of optical markings on a card in accordance with the DIN standard 9781, Part I. For cancelling, an erase head according to CH-PS 640 075 is used which is brought directly to the value character to be cancelled and which is heated by an electrical current impulse in order to increase the temperature locally in the credit card in such a way that the optical character beneath it is destroyed. With this solution, the entire energy to be expended for erasure purposes has to be supplied from the outside in the form of thermal energy.

With solutions of this kind, great losses occur. Thus, a large part of the thermal energy is lost by heating the erase head and by the conduction of heat from the erase head into the surroundings. Further losses occur in overcoming the thermal contact resistance. Approximately ten times the energy has to be expended as is needed for cancelling a value character.

A credit payment means is also disclosed in CH-PS 604 279, wherein the carrier material which contains the value characters in the form of optically recognisable markings has a form reminder capacity which can be excited by the supply of energy and which produces a change in the form of the carrier material and also of the markings. By way of this solution, the optically recognisable markings are, admittedly, able to be erased using a lesser amount of externally supplied energy. However, special materials have to be used which have a form reminder capacity.

SUMMARY OF THE INVENTION

An object of the invention is to create a carrier and a further method of changing the optical characteristics of a value character or display field on a carrier, wherein only a minimum amount of energy has to be supplied externally.

In accordance with a first aspect of the invention, there is provided A method for changing the optical characteristics of a display field on a carrier by releasing erase energy in the region of said display field, the method comprising the steps of:

a) storing erase energy in a storage medium in the region of said display field on said carrier; and b) releasing the erase energy as heat by the supply of an initial energy which is less than said erase energy.

In accordance with a second aspect of the invention, there is provided a carrier comprising: at least one display field, the optical characteristics of which are able to be changed by the supply of an erase energy; and an energy carrier arranged in the region of said display field wherein the energy content of said energy carrier corresponds at least to said erase energy; said erase energy being releasable as heat by the supply of an initial energy which is less than said erase energy.

Thus the invention employs a storage layer for storing energy which is released as thermal energy.

The invention can advantageously be used wherever permanent changes have to be effected in a material by the effects of heat, e.g. for melting or deforming embossed structures, for destroying holograms, for permanently colouring materials and the like. The invention is particularly advantageous in the case of card readers having thermal card cancellation which have to manage with a small electrical current supply, for example in the operation of telephones. By virtue of the invention, merely the initiation of the cancellation operation is necessary, this being started by heating a very small volume of the storage layer for a short period of time, for example by employing a focused light beam. The invention is particularly suitable for use where a relatively large surface area has to be heated.

If a photoconductive layer is used additionally, the cancelling operation can be initiated by directly supplying electrical current for the value character to be cancelled, by the electrical resistance heating of a photoconductive layer portion. An advantage of this is a simplification of the optical card reading device. The display field or value character to be erased can be cancelled by the reader light beam, so that an erase head or erase head field with accurate positioning relative to the reader light beam is not needed.

BRIEF DESCRIPTION OF THE DRAWINGS

FIG. 4 is a carrier according to a third embodiment of the invention.

FIG. 5 is a carrier according to a fourth embodiment of the invention.

FIG. 6 is the mode of operation of the carrier according to claim 4.

DESCRIPTION OF THE PREFERRED EMBODIMENTS

Figure 1:
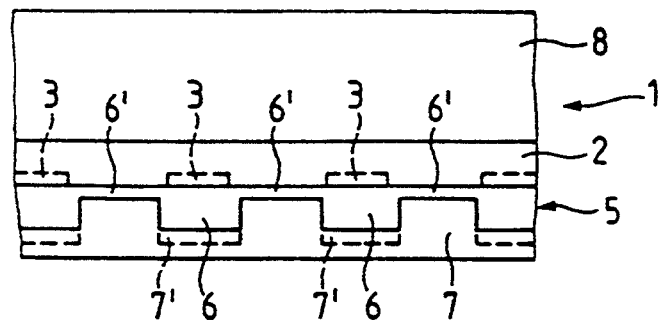
FIG. 1 shows a carrier according to a first embodiment of the invention.
Figure 3:
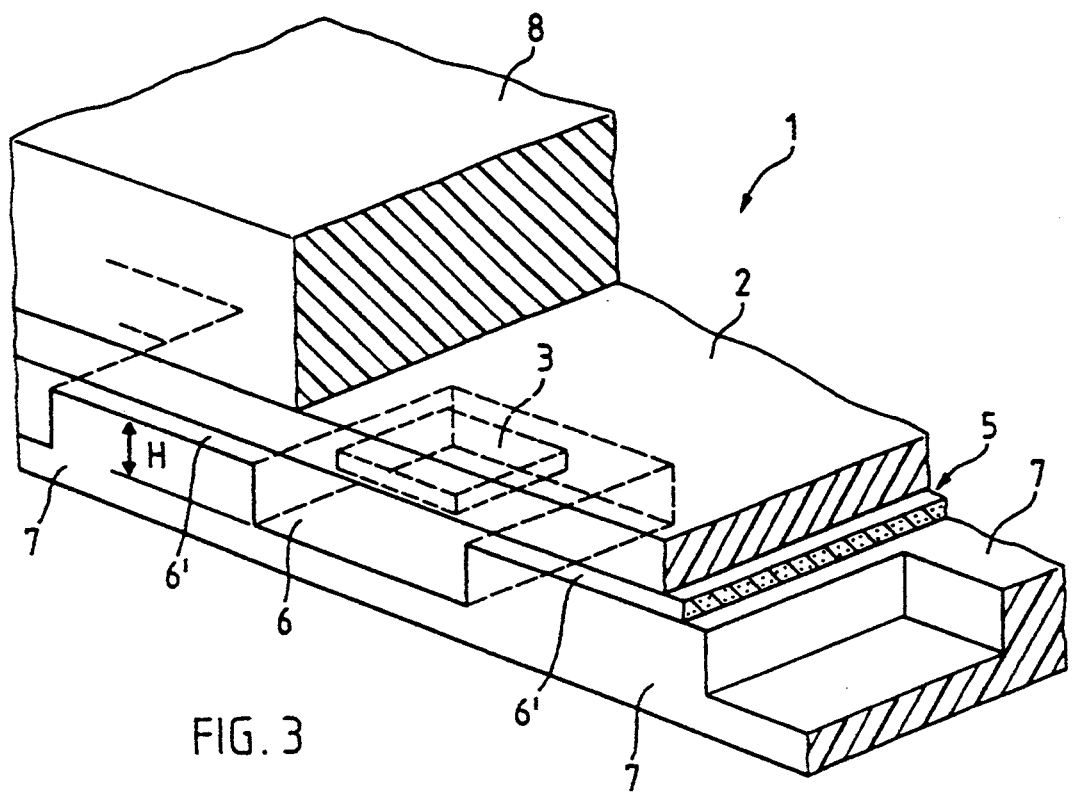
FIG. 3 is a perspective view of the various layers of the carrier according to FIG. 1.

FIGS. 1 and 3 show a first embodiment of a carrier 1 having a character carrier layer 2, in or on which display fields 3 are arranged. The character carrier layer 2 consists of a heat-sensitive thermoplastics material into which the display fields 3 are embossed, embedded or are applied using another suitable technique. Disposed under the character carrier layer 2 is a storage layer 5 consisting of a pyrotechnical material. The storage layer 5 is formed under each display field 3 as, for example, a square erase section 6 of layer thickness H (see FIG. 3). Between the individual erase sections 6, the storage layer 5 consists of thin layer portions 6'. It is also possible for the thin layer portions 6' to be completely absent, so that the individual erase sections 6 are completely isolated from one another. The storage layer 5 is covered by an inert protective layer 7. Arranged over the character carrier layer 2 is a carrier layer 8 which imparts rigidity to the carrier 1. It is also possible for the protective layer 7 to act as a support for the carrier layer 8. In addition, an absorbing layer 7' can be arranged under the erase sections 6.

If the pyrotechnical material of one individual erase section 6 is fired, a sufficient amount of heat is produced in the erase section 6 to destroy the associated display field 3.

Preferably, the pyrotechnical material of an erase section 6 is fired from the side of the protective layer 7 with the help of an erase head. The protective layer 7 therefore has to be thin and of good heat conductivity, so that the heat transmission resistance is low. If, however, a focused light beam, for example from a laser diode is used for firing purposes, firing can be effected both from the side of the protective layer 7 and also from the side of the carrier layer 8. In this case, the protective layer 7 or the character carrier layer 2 and the carrier layer 8 for radiation used to fire the erase section 6 must be permeable. In addition, the character carrier layer 2 and the carrier layer 8 must also be permeable to reader light beams, depending on where the display fields 3 are arranged. If the pyrotechnical material in the erase section 6 is fired by focused light beams, the storage layer 5 should absorb all the light energy possible, which can be achieved by way of the absorbing layer 7' or by adding an absorbing agent to the pyrotechnical material of the storage layer 5.

Pyrotechnical materials have a latent energy which is released as heat on exothermal conversion of the molecular or crystal structure of at least one of the components. In the case of the materials used, a chemical reaction or phase conversion automatically takes place, as soon as a small volume of material reaches a critical temperature. These pyrotechnical materials have been known per se for some time, see e.g. H. Ellern: Military and Civilian Pyrotechnics, Chem. Publ. Co., New York, N.Y. 1968.

It is advantageous if the pyrotechnical material is able to be produced and processed in the form of thin films or layers. Examples of such are nitrocellulose or heterogeneous mixtures of inorganic reactants with a binding agent. These per se known binding agents can participate in the reaction or advantageously promote it, for example, by lowering the firing temperature.

Pyrotechnical materials which produce gaseous reaction products are not suitable for the intended use as an energy storage layer, since these materials transport away part of the reaction heat and in the case of a storage layer which is enclosed on all sides can produce blisters or even cracks. Only small amounts of gases which either diffuse through the other materials or are adsorbed by same can be tolerated. Inorganic systems consisting of a mixture of a finely pulverised metal such as titanium, silicon, magnesium etc. and high value oxides of iron, tin, titanium, manganese or lead are known as pyrotechnical heat compositions which are advantageous in that they generate small amounts of gas.

The extent of the conversion or reaction in the pyrotechnical material can be influenced by various factors, for example by the choice of material, by the grain size, by the pressing density, by binding agents present and by the geometry of the erase section 6. A reliable spread of the reaction within the erase section 6 occurs if the thickness H (see FIG. 3) exceeds a threshold value. If the thickness H is less than the threshold value, the reaction stops, e.g. at the edge of the erase section 6.

The most reliable way of stopping the reaction at the edge of the erase section 6 is to isolate and to distance the erase sections 6 from one another.

However, if the individual erase sections 6 of the storage layer 5 are connected together by way of thin layer portions 6' as in FIGS. 1 to 6, then these must always be thin enough to prevent the reaction from being able to propagate within them. This is achieved by selecting the thickness of the thin layer portions 6' so that it is approximately three to five times less than the threshold value of the layer thickness H, at which value the reliable spread of reaction just takes place within the erase section 6. In this way it can be ensured that the reaction is not able to spread beyond a single erase section 6. The surface profile produced by the different thicknesses is smoothed by a filling of an inept protective material, the protective layer 7. This can be done, for example, by rolling on the material of the protective layer in a plastic state.

Figure 2:
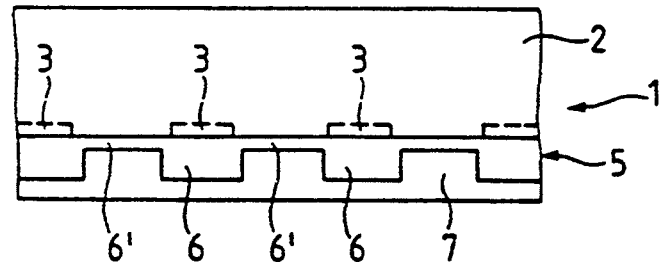
FIG. 2 shows a carrier according to a second embodiment of the invention.

FIG. 2 shows a second embodiment of a carrier 1. The display fields 3 are arranged in or on the character carrier layer 2 which here also assumes the function of the carrier layer 8 (cf. FIG. 1), thus imparting sufficient rigidity to the carrier 1. This solution is advantageous if the material of a carrier layer 8 (cf. FIG. 1) is itself suitable for the application of the display fields 3.

FIG. 4 shows a third embodiment of a carrier 1 having an additional conductive layer in the form of a photoconductive layer 9. The photoconductive layer 9 is made of a material which on being illuminated, for example, by a visible or infra-red light, becomes electrically conducting at the position illuminated. An electrical current is supplied through the position which has been made conductive, thus acting as a heating resistance. In this way, temperature is increased locally which fires the pyrotechnical material in the selected erase section 6. The photoconductive layer consists of inorganic compounds such as CdS, CdSe or PbS, with sensitivities in the visible region or in near infra-red, which are known per se. The heat transition resistance between the photoconductive layer 9 and the storage layer 5 must be small so that heat transfer is ensured. The character carrier layer 2 which is disposed between the photoconductive layer 9 and the storage layer 5 must not interfere with heat transmission and is therefore thin and as heat-conductive as possible. Conductive tracks 10 are arranged or embedded in the photoconductive layer 9 in such a way that a conductive track 10 is present on both sides of each display field 3. Therein, the individual conductive tracks 10 are connected to terminals 11, 12 of a power source (see FIGS. 6 and 7), in such a way that opposite electrical polarities are always placed on either side of a display field 3.

FIG. 5 shows a fourth embodiment of the carrier 1. The display fields 3 are arranged in or on the character carrier layer 2 which here assumes the function of the carrier layer 8 (cf. FIG. 1 and FIG. 4), thus imparting sufficient rigidity to the carrier 1. This carrier 1, also, has a photoconductive layer 9 which, however, is here arranged directly on the storage layer 5, which ensures good heat transfer. This solution is advantageous if the material of a carrier layer 8 (cf. FIG. 4) is itself suitable for the application of display fields 3.

FIG. 6 illustrates the erasure operation with a carrier 1 having a photoconductive layer 9 (cf. also FIG. 4). One of the display fields B is recognised by an optical reading device, not shown and having a reading light beam 13, as not yet cancelled when the carrier 1 is scanned. The reading light beam 13 produces charge carriers in the photoconductive layer 9, so that an electrical current I begins to flow from the first terminal 11 of the power source through the first adjoining conductive track 10, the illuminated part of the photoconductive layer 9 and the second adjoining conductive track 10 to the second terminal 12 of the power source until the electrical current I flowing has produced sufficient local heat to trigger the conversion reaction in the erase section 6. Once the conversion reaction in the erase section 6 has been set in motion, it automatically continues and the thermal energy released as a result is sufficient to destroy the display field 3 or at least to change it in such a way that it is recognised by the reading light beam 13 as having been cancelled.

Figure 7:
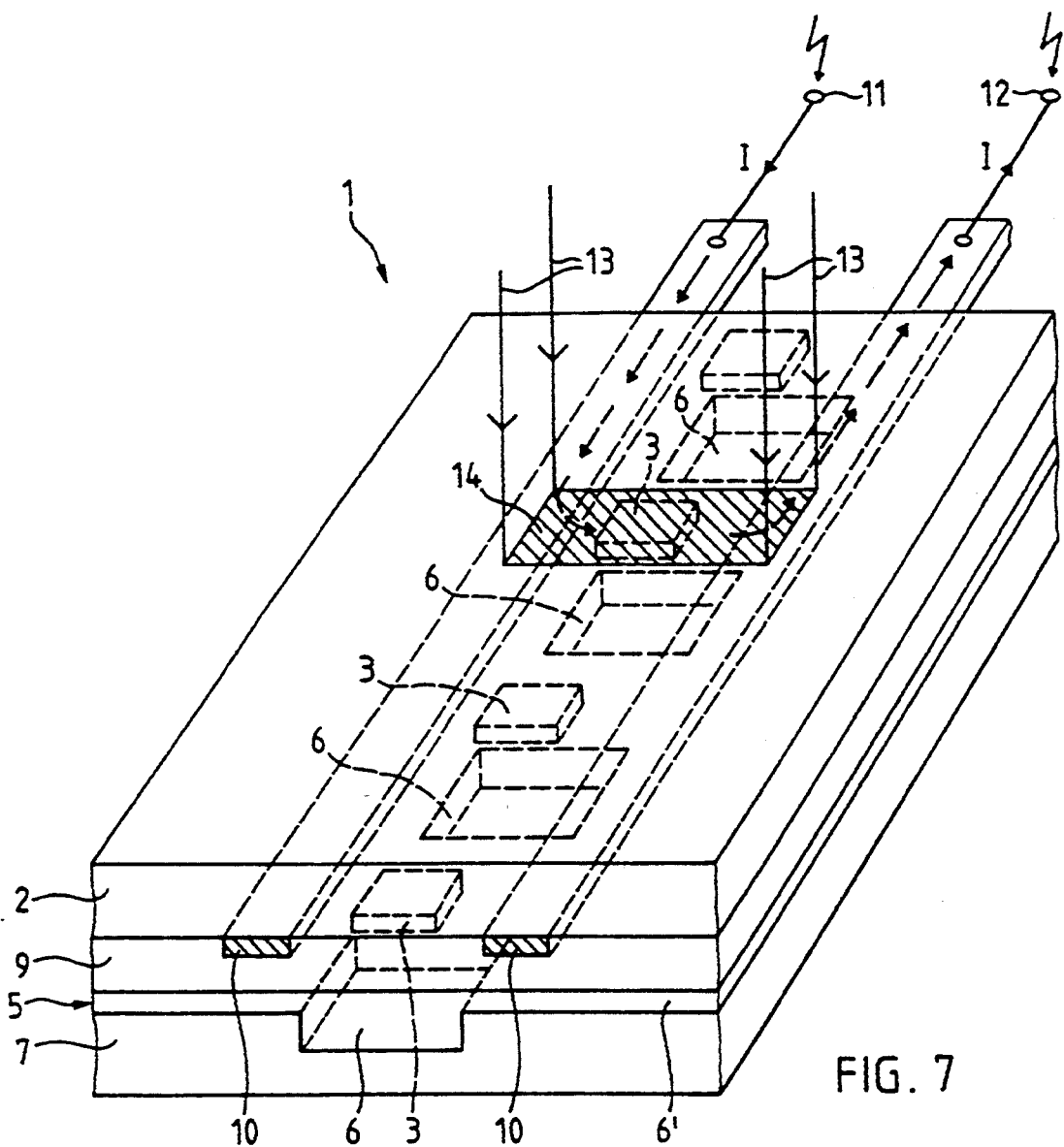
FIG. 7 is a view in perspective of a part Of the carrier according to claim 5.

FIG. 7 shows, in perspective, a part of a carrier 1 having a photoconductive layer 9 (cf. also the corresponding arrangement in FIG. 5). The conductive tracks 10 in the photoconductive layer 9 extend on both sides along the display fields 3 and along the erase sections 6 arranged under them. If one of the display fields 3, which is still not recognised as cancelled, is illuminated by the reading light beam 13, then, in a field 14 in the photoconductive layer 9 which is illuminated by the reading light beam 13, the electrical current I begins to flow between the two conductive tracks 10. The cancellation process therefore begins by the effects of electrical resistance heating in the photoconductive layer 9. The advantage of this arrangement is that no additional erase head is needed and thus no erase head field has to be positioned accurately relative to the reading light beam. The photoconductive layer 9 becomes conductive only exactly at the position illuminated by the reading light beam 13, so that it is only ever the one illuminated value character which is cancelled.

The current source can be integrated into the carrier 1 in the form of a battery or a solar cell, for example, or the electrical energy can be supplied externally, such as by means of electrical contacts or by induction.

The carrier according to the invention is based on a composite layer body. The method, such as rolling, vapour deposition, electrolytic layer construction, impressing, etc. for producing composite layer bodies are known per se and are therefore not described further.

The invention can be used advantageously where erase- and cancelling operations must be carried out, e.g. for a card-like credit payment means where a small available electrical supply has to suffice, as is the case, for example, with the supply of energy to a card reading device via a telephone network. The invention can also be used for all applications where accurate local heating is used to produce a permanent change, but where the thermal energy required is not able to be applied, or simply transferred, locally.

Although illustrative embodiments of the invention have been described in detail herein with reference to the accompanying drawings, it is to be understood that the invention is not limited to those precise embodiments, and that various changes and modifications can be effected therein by one skilled in the art without departing from the spirit and scope of the invention as defined by the appended claims.

We claim

1. A method for changing the optical characteristics of a display field on a carrier by releasing erase energy in the region of said display field, the method comprising the steps of:
   a) storing erase energy in a storage medium in the region of said display field on said carrier; and
   b) releasing the erase energy as heat by the supply of an initial energy which is less than said erase energy.

2. A method according to claim 1, wherein said erase energy is released by chemical or phase conversion of said storage medium.

3. A method according to claim 1 wherein said initial energy is supplied as a flow of heat.

4. A method according to claim 1 wherein said initial energy is supplied in the form of electromagnetic radiation.

5. A method according to claim 3, wherein said flow of heat is produced by an electric current which flows in the region of said storage medium.

6. A carrier comprising:
   at least one display field, the optical characteristics of which are able to be changed by the supply of an erase energy; and
   an energy carrier arranged in the region of said display field wherein the energy content of said energy carrier corresponds at least to said erase energy;
   said erase energy being releasable as heat by the supply of an initial energy which is less than said erase energy.

7. A carrier according to claim 6 wherein:
   said display field(s) is/are arranged in or on a character carrier layer;
   said energy carrier is in the form of a storage layer with erase sections;
   said energy carrier is in thermal contact with said character carrier layer; and
   a said erase section is associated with each display field.

8. A carrier according to claim 7 wherein each said erase section is arranged under a respective said display field.

9. A carrier according to claim 8 comprising a photoconductive layer which can be transferred into an electrically conductive state by the illumination of said display field by means of a reading light beam, said photoconductive layer being arranged in the region of said display field(s) in thermal contact with said erase section(s), and contacting conductive tracks on both sides of each said display field, which conductive tracks are connected to terminals of a current source.

10. A carrier according to claim 9 wherein said character carrier layer is disposed between said photoconductive layer (9) and said storage layer.

11. A carrier according to claim 9 wherein said photoconductive layer is disposed between said character carrier layer and said storage layer.

* * * * *